United States Patent

Lindblom

[15] 3,643,708
[45] Feb. 22, 1972

[54] DELIMBING ARRANGEMENT
[72] Inventor: Karl Thore Lindblom, Alfta, Sweden
[73] Assignee: Ostbergs Fabriks AB, Alfta, Sweden
[22] Filed: Jan. 20, 1970
[21] Appl. No.: 4,277

[30] Foreign Application Priority Data
Jan. 31, 1969 Sweden..................................1303/69

[52] U.S. Cl............................................................144/2 Z
[51] Int. Cl.........................................................A01g 23/02
[58] Field of Search.....................144/2 Z, 3 D, 34 R, 208 R,
144/208 G, 208 H, 309 AC

[56] References Cited

UNITED STATES PATENTS

| | | | |
|---|---|---|---|
| 3,556,181 | 1/1971 | Jouppi | 144/2 Z |
| 1,558,735 | 10/1925 | McArthur | 144/2 Z |
| 2,948,311 | 8/1960 | McCollum | 144/2 Z |
| 2,989,097 | 6/1961 | Bombardier | 144/208 R |
| 3,008,731 | 11/1961 | Bombardier | 144/2 Z |
| 3,531,235 | 9/1970 | Boyd et al. | 144/2 Z |

Primary Examiner—Gerald A. Dost
Attorney—Pierce, Scheffler & Parker

[57] ABSTRACT

The delimbing apparatus of the present invention is an improvement over the conventional chain link type of delimber, the improvement being characterized in that the cutting circumference of the chain link device of the apparatus acts in the axial direction of the link pivots and is offset successively in said direction for consecutively shearing off limbs projecting from the same tree trunk level.

3 Claims, 6 Drawing Figures

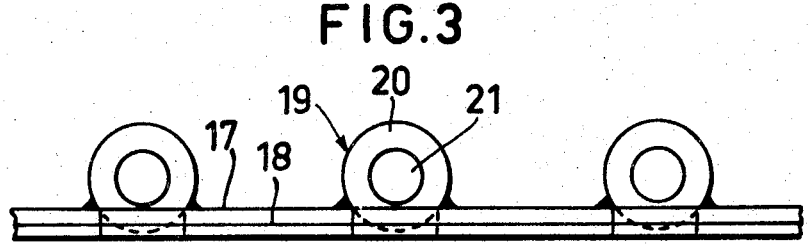
FIG.3
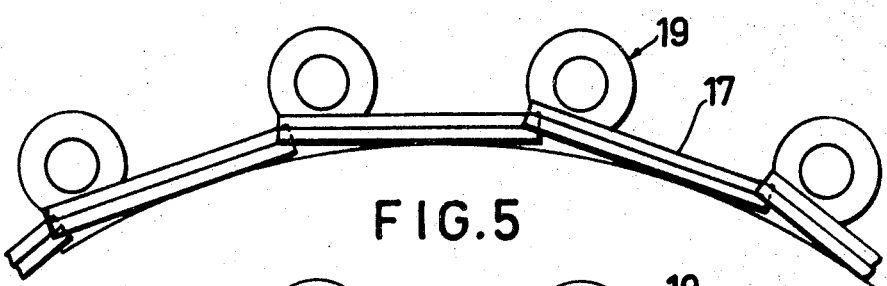
FIG.4
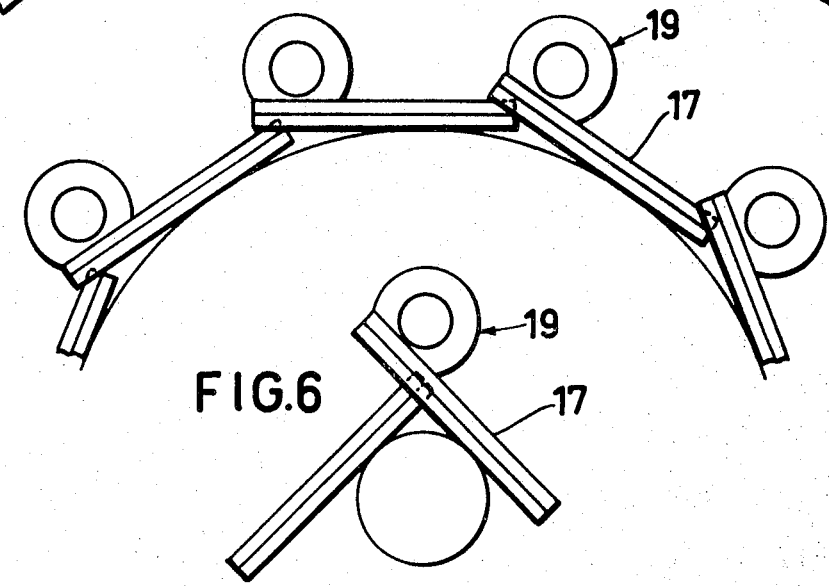
FIG.5
FIG.6

DELIMBING ARRANGEMENT

This invention relates to a delimbing arrangement of the kind comprising a chain link device which embraces the trunk, the link pivots extending in the longitudinal direction of the trunk.

At conventional delimbing chains embracing the trunk it has been regarded necessary so to dimension the chain and its drive unit, respectively (or, in the case of a stationary chain, the drive unit for the trunk) that it corresponds to the total resistance exercised by limbs and branches in every so-called internode on the trunk. "Internodes" are to be understood in this connection as the crown-shaped configurations formed on the trunk by the branches between substantially branch-free trunk parts.

The dimensioning of the delimbing chain and drive unit, respectively, can considerably be reduced by the arrangement according to the invention which is characterized in that the cutting circumference of the chain link device acts in the axial direction of the link pivots and is offset successively in said direction for consecutively shearing off limbs projecting from the same trunk level. In addition, the operation will be substantially smoother than the previous working which necessarily was distinctly intermittent, and accordingly the chain as well as the drive unit will be spared to a high degree.

Figure 1:
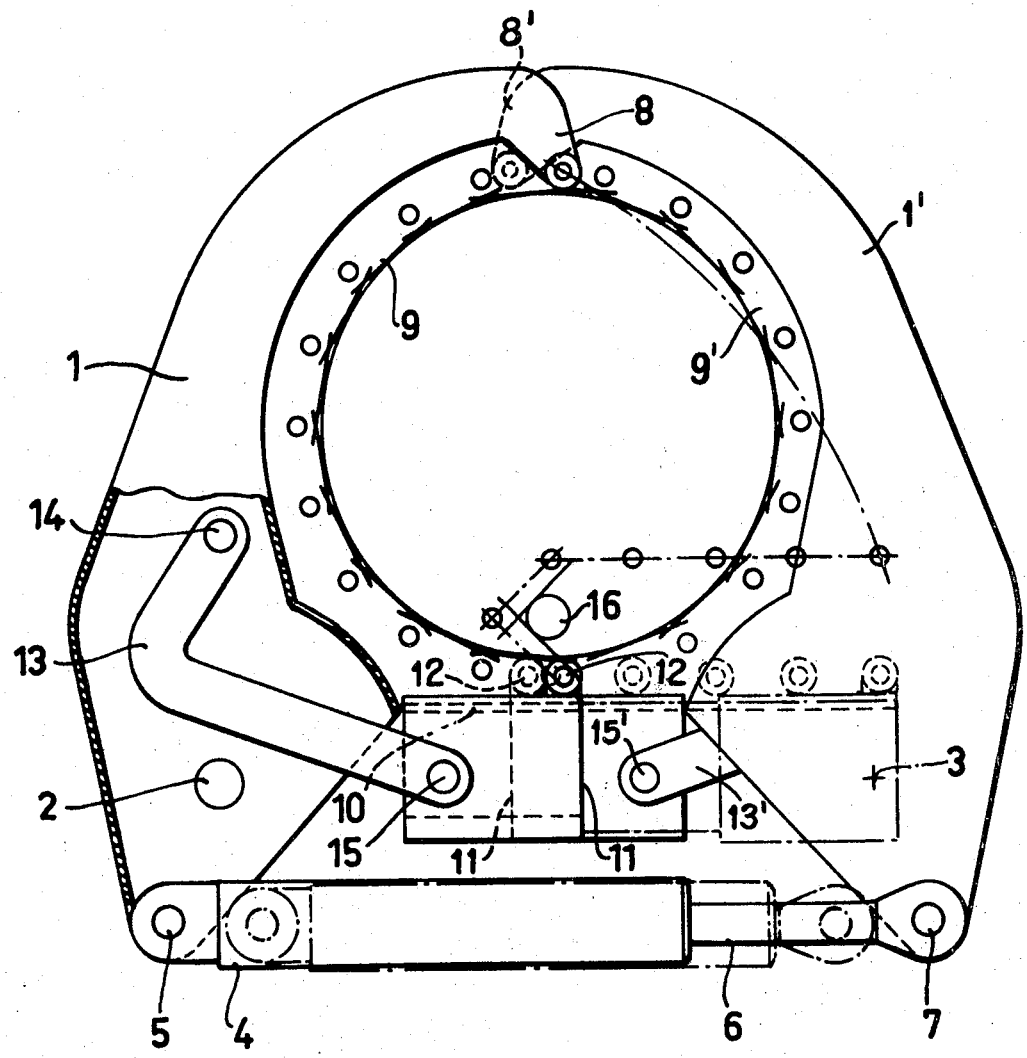
Figure 2:
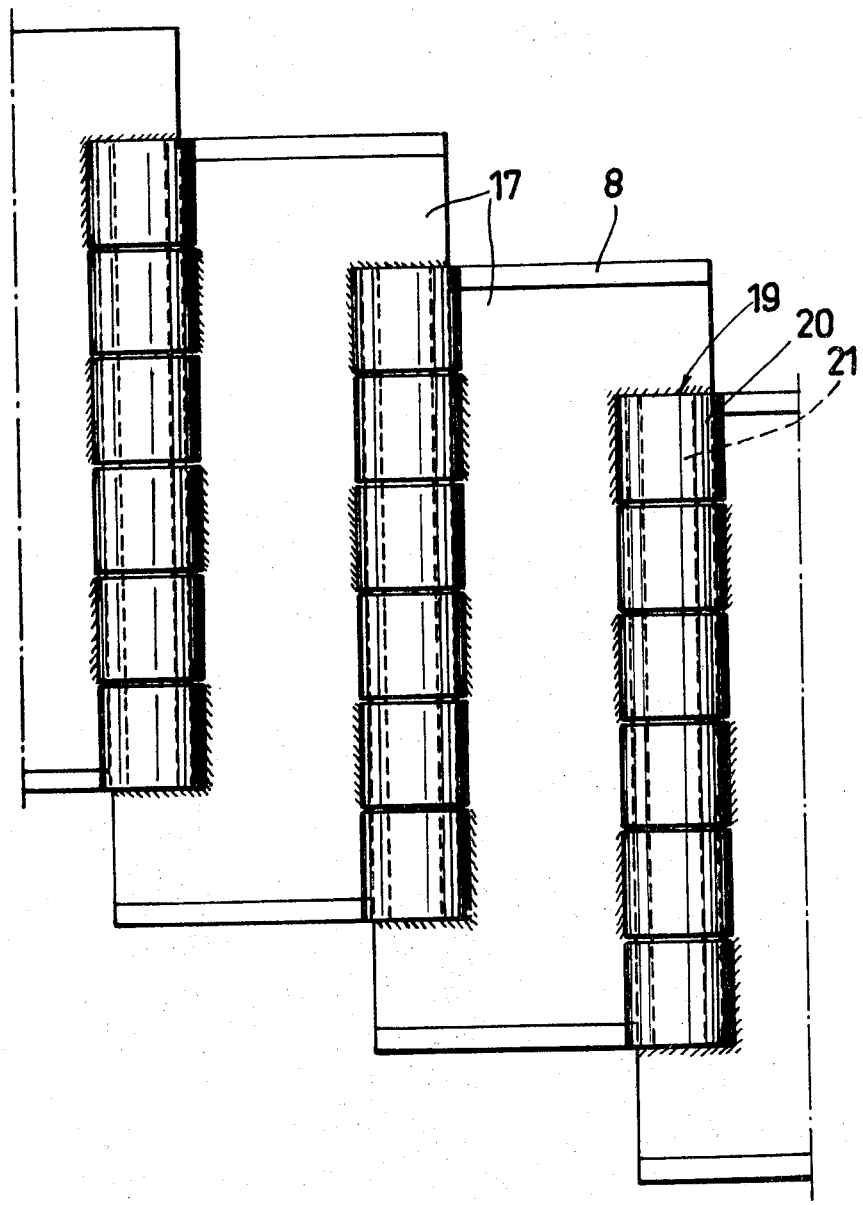

The invention is described in greater detail in the following, with reference to the accompanying drawings wherein:

FIG. 1 shows a schematic front view of a delimbing arrangement according to the invention, FIGS. 2 and 3 show on a larger scale a plan and an end view, respectively, of a spreadout part of the chain link device comprised in the delimbing arrangement, and FIGS. 4-6 show schematic end views of the chain link device embracing trunk cross sections of different dimensions.

The two halves of the delimbing arrangement shown in FIG. 1 are mirror symmetrical about the vertical line of the Figure. For purposes of simplification, the description is restricted substantially to cover the half shown in the left-hand side of the figure.

A curved arm 1 is pivotally mounted at its lower portion about a fixed point 2 at one end of a carrier beam not shown in detail. At the other end of said beam a corresponding and reversed arm (associated to the right-hand half) is mounted about the fixed point 3. The arm 1 (and also the other arm) have an extension projecting below the mounting point 2 (and 3, respectively). At the end of said extension the cylinder 4 for a hydraulic means engages in the point 5. In an analogous manner, the piston rod 6 of said means engages at the lower extension of arm of arm 1' in point 7. The condition of the means shown by fully drawn lines—said means is fed from a hydraulic source not shown —corresponds to the maximum gripping position for the arms when their points touch each other, as shown in the Figure (the point of the arm 1 is designated by 8). Upon contracting the hydraulic means 4, 6 to the condition shown by dash-dotted lines, the two arms are pivoted outwards about the respective mounting points 2 and 3 so as to form for the trunk in question an inlet opening between the arm points. Upon expanding the hydraulic means beyond the fully drawn line, a corresponding inward pivotal motion and overlapping of the two arms is obtained.

A chain link device 9 is mounted with one end at the point 8 of the arm 1 and with its other end at a slide 11 in a point 12 on its upper surface, said slide being connected to the lower part of the arm and horizontally guided on a tube 10.

Analogously, arm 1' is equipped with a similar chain link device (not shown in detail) mounted with one end at point 8' of arm 1' and with its other end on similar slide 11' in a point 12', on its upper surface, slide 11' being connected to the lower part of arm 1' and horizontally guided on a tube similar to tube 10 and disposed beside and parallel to tube 10. Thereby arms 1 and 1' are enabled to overlap, surrounding log 16 with the shearing means. A joint 13 which here is shown angular but which in principle may be straight (if this does not obstruct the final phase of the inward pivotal motion), is mounted with one end in a point 14 in the arm 1 above its pivotal point 2 and with its other end in a point 15 in the sidewall of slide 11. Upon a far-reaching inward swing of arm 1 by the hydraulic means 4, 6 the joint 13 causes the slide 11 to move to the right (in the Figure) and thereby the lower mounting point 12 of the chain link device to the dash-dotted position. When a narrow trunk 16 is inserted between the arms, then the chain link devices associated to the respective arms—because the arrangement of the other arm is entirely analogous to that of arm 1, but reverse—will transform from the semicircular form shown, which applies to a trunk of maximum thickness, to a longitudinal lying U-shape (shown schematically only for the chain line device of arm 1) where the yoke of the U embraces the trunk 16 even when it is of a very small thickness, as appears from the Figure.

An embodiment of the construction of the chain link device according to the invention is shown in FIGS. 2-6. FIG. 2 shows a section of the spreadout chain link device, the links of which are rectangular knife blades 17 having cutting edges 18 at least at one end. If the trunk is desired to be adapted for insertion between the arms from both directions, the blades are provided with cutting edges also at the other end, as shown in the Figure. The blades 17 are connected relative one another by pivots with the general designation 19, formed by aligning tubular sleeves 20 (see FIG. 3) which alternatingly are secured by welding to adjacent blades and through which a pin 21 is threaded. According to the idea of the invention, the knife blades 17 so are offset longitudinally relative each other that the edge side (edge sides) of the chain link device or delimbing chain are given a stepped outline, as shown in FIG. 2. It is then obvious that when the chain 17, 19 is caused to embrace a trunk and this trunk is moved in its longitudinal direction in relation to the chain, the branch nodes of the trunk are engaged by degrees or steps, so that the branches are cut off one after the other instead of simultaneously as it heretofore has been the case.

FIGS. 4-6 show in a schematic way the chain seen from its cutting edge when embracing trunks with diameters 22'', 11'' and 2'', respectively. FIG. 6 illustrates particularly the fact that even at very small trunk diameters the branch or limb bosses remaining on the trunk are highly insignificant (see also FIG. 1).

The invention is not restricted to the embodiment described above. Particularly the edge outlines of the knife blades 17 offset longitudinally relative each other may be varied in different ways, for example by a bevelling, so that the blades in addition to their pure shearing effect also are given a slide-cutting effect. Said bevelling may be given a size such that the edges of the blades together form one single straight edge which upon embracing the trunk follows a helix. The invention, of course, is neither bound to the shown embodiment of the hinges between the blades nor to the special arm arrangement for effecting the embracing of the trunk by the chain link device, but different modifications are possible within the scope of the invention. It is not necessary, for example, that the chain link device can be opened upwardly for inserting the trunk, and the tightening of the chain can be carried out in a way different than that shown.

What I claim is:

1. A delimbing device comprising
   a support;
   two arms each being pivoted at one of its ends at fixed and spaced points on said support;
   drive means for rotating the arms about their pivot points between an open position and an overlapping relationship position,
   each arm carrying a chain link part adapted to cut in the longitudinal direction of a tree trunk embraced by the arms,
   each chain link part being secured at one end to the other end of an arm remote from its pivot end,
   the other end of each chain being connected to a tightening means displaceable substantially along a line through said fixed points; and means for effecting the displacement of said tightening means towards and from each other synchronously with the rotation of said arms to their overlapping and open position, respectively.

2. The delimbing device defined in claim 1, wherein the means for effecting the displacement of each said tightening means includes a lever having one end pivoted at a point between the ends of the associated arm and having its other end pivoted by said tightening means, said tightening means including a member translatorily slidable in guide means whereby the tightening means with attached chain ends are displaced simultaneously with the rotation of the two arms.

3. The delimbing device defined in claim 1, wherein each of the two chain link parts is composed by pivotally interconnected knife blades.

* * * * *